(No Model.)

M. BOLSINGER.
BOUQUET HOLDER.

No. 584,170. Patented June 8, 1897.

WITNESSES

INVENTOR
Michael Bolsinger,
By John Wedderburn
Attorney

UNITED STATES PATENT OFFICE.

MICHAEL BOLSINGER, OF CINCINNATI, OHIO.

BOUQUET-HOLDER.

SPECIFICATION forming part of Letters Patent No. 584,170, dated June 8, 1897.

Application filed February 16, 1897. Serial No. 623,671. (No model.)

*To all whom it may concern:*

Be it known that I, MICHAEL BOLSINGER, of Cincinnati, in the county of Hamilton and State of Ohio, have invented certain new and useful Improvements in Bouquet-Holders; and I do hereby declare the following to be a full, clear, and exact description of the invention, such as will enable others skilled in the art to which it appertains to make and use the same.

My invention relates to certain improvements in bouquet-holders, and particularly to that class designed for use in connection with the buttonhole of a lapel of a coat, the object being to provide a holder of this character which shall be simple and inexpensive in construction and which can be readily applied to a buttonhole and quickly removed therefrom when desired.

My invention comprises certain novel features of construction whereby the device is made simpler and better adapted for the purpose for which it is intended, as will be hereinafter fully described, and specifically defined in the appended claims.

Figure 1:
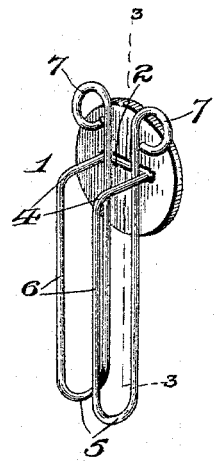
Figure 2:
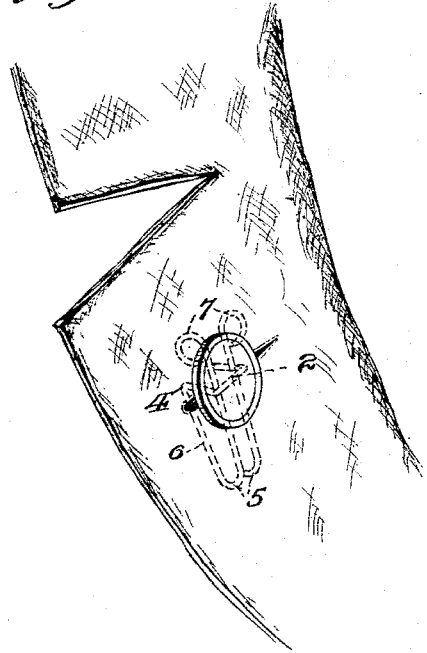
Figure 3:
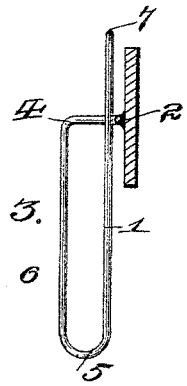

In the accompanying drawings, Figure 1 represents a perspective view of a holder embodying my invention, looking toward the rear. Fig. 2 is a similar view showing it applied to the buttonhole of a coat. Fig. 3 is a vertical section taken on the line 3 3 of Fig. 1.

Similar reference-numerals designate corresponding parts in all the figures of the drawings.

1 represents a strand of spring-wire having its intermediate portion bent to form a loop 2 sufficiently deep to receive the stem of the bouquet, the said wire being bent at the points 4, whence its branches turn downwardly to a point marked 5, their extremities 6 being turned inwardly and upwardly to pass through the loop 2, above referred to, their ends being bent to form outwardly-projecting loops or eyes 7. The loop may be provided upon the outside with an ornamental design, such as a button, upon which suitable characters or other insignia may be printed, and this design may be soldered or otherwise fastened thereto, as may be found most convenient.

The wire is inserted within the buttonhole, and the loops or eyes 7 engage with the ends of the buttonhole and serve to keep the holder in place therein, and a pressure upon the lapel of the coat above the buttonhole will serve to force the ends of the wire back from contact with the loop and thus provide a space for the insertion of the bouquet, after which the pressure upon the lapel is removed, whereupon the loops or eyes will press forward again and thus securely hold the bouquet in place.

Although I have shown my invention as constructed from a piece of round spring-wire, it is obvious that the same may be made out of flat steel, brass, or other material having the proper spring qualities.

Having thus described my invention, what I claim as new, and desire to secure by Letters Patent, is—

1. A bouquet-holder comprising a loop adapted to receive the stem of the bouquet, and spring-arms to engage in said loop to retain the bouquet in place therein, the said arms being provided with enlarged terminals adapted to engage the buttonhole and retain the holder in place, substantially as described.

2. A bouquet-holder, constructed from a strand of spring-wire the intermediate portion thereof being bent to form a loop, its branches being bent to pass within said loop, and the terminals thereof being bent to form outwardly-projecting loops or eyes, substantially as described.

3. A bouquet-holder, comprising a strand of spring-wire, the intermediate portion thereof being bent to form a loop, and a button arranged upon said loop, the extremities of said wire being bent to pass within said loop, and the terminals thereof being bent to form outwardly-projecting loops or eyes, substantially as described.

In testimony whereof I have signed this specification in the presence of two subscribing witnesses.

MICHAEL BOLSINGER.

Witnesses:
H. F. BRASHEAR,
R. C. TAYLOR.